United States Patent
Pieczul et al.

(10) Patent No.: US 11,799,861 B2
(45) Date of Patent: *Oct. 24, 2023

(54) SECURE ACCESS MANAGEMENT FOR TOOLS WITHIN A SECURE ENVIRONMENT

(71) Applicant: International Business Machines Corporation, Armonk, NY (US)

(72) Inventors: Olgierd Pieczul, Castleknock (IE); Jinhui Wang, Mulhuddart (IE)

(73) Assignee: International Business Machines Corporation, Armonk, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 17/128,061

(22) Filed: Dec. 19, 2020

(65) Prior Publication Data
US 2021/0152556 A1 May 20, 2021

Related U.S. Application Data

(63) Continuation of application No. 16/391,131, filed on Apr. 22, 2019, now Pat. No. 10,924,486, which is a (Continued)

(51) Int. Cl.
*G06F 7/04* (2006.01)
*H04L 9/40* (2022.01)
(Continued)

(52) U.S. Cl.
CPC ............ *H04L 63/10* (2013.01); *G06F 21/62* (2013.01); *G06F 21/6218* (2013.01);
(Continued)

(58) Field of Classification Search
CPC . H04L 63/10; H04L 63/0435; H04L 63/0442; H04L 63/061; H04L 63/126;
(Continued)

(56) References Cited

U.S. PATENT DOCUMENTS 7,103,772 B2  9/2006  Jorgensen et al.
9,354,927 B2 * 5/2016  Hiltgen .................. G06F 21/53
(Continued)

FOREIGN PATENT DOCUMENTS

CN      1961525 A     5/2007
CN    101398824 A     4/2009
(Continued)

OTHER PUBLICATIONS

Shin et al, DFCloud: A TPM-based Secure Data Access Control Method of Cloud Storage in Mobile Devices, Dec. 6, 2012, IEEE, pp. 551-556 (Year: 2012).*

(Continued)

*Primary Examiner* — Philip J Chea
*Assistant Examiner* — Jenise E Jackson
(74) *Attorney, Agent, or Firm* — SHACKELFORD, BOWEN, MCKINLEY & NORTON, LLP

(57) ABSTRACT

A method, system and computer program product for secure access management for tools within a secure environment. A virtual file system for a user in memory on a server side in the secure environment is accessed as part of an authenticated user session including a user command instigated by a user. At the virtual file system, an encrypted file stored in the secure environment is obtained, where the file is encrypted using a public key of a user. A read operation at the virtual file system of the encrypted file is intercepted and the encrypted file is sent to a client at a user system external to the secure environment over a secure connection for decryption by a remote cryptography device of the user system using the user's private key. The decrypted file is then received at the virtual file system enabling the user to run the required user command.

20 Claims, 10 Drawing Sheets

Related U.S. Application Data continuation of application No. 15/788,647, filed on Oct. 19, 2017, now Pat. No. 10,834,081.

(51) Int. Cl.
*H04L 67/06* (2022.01)
*G06F 21/62* (2013.01)

(52) U.S. Cl.
CPC ...... *H04L 63/0435* (2013.01); *H04L 63/0442* (2013.01); *H04L 63/061* (2013.01); *H04L 63/126* (2013.01); *H04L 67/06* (2013.01); *G06F 2221/2107* (2013.01)

(58) Field of Classification Search
CPC ..... H04L 67/06; G06F 21/62; G06F 21/6218; G06F 2221/2107
See application file for complete search history.

(56) References Cited

U.S. PATENT DOCUMENTS

| | | | |
|---|---|---|---|
| 9,584,325 | B1 | 2/2017 | Brandwine et al. |
| 9,785,785 | B2 | 10/2017 | O'Hare et al. |
| 9,811,678 | B2 | 11/2017 | Tanik et al. |
| 10,157,290 | B1 | 12/2018 | Sinha et al. |
| 2004/0221163 | A1* | 11/2004 | Jorgensen ............. H04L 9/3066 713/182 |
| 2005/0114870 | A1* | 5/2005 | Song ..................... G06F 21/52 719/328 |
| 2005/0268336 | A1* | 12/2005 | Finnegan ................ G06F 21/31 714/E11.207 |
| 2007/0174457 | A1 | 7/2007 | Matsuki et al. |
| 2008/0165957 | A1* | 7/2008 | Kandasamy ........ G06F 21/6218 713/175 |
| 2009/0063869 | A1* | 3/2009 | Kohavi ............... G06F 21/6218 726/16 |
| 2011/0213971 | A1* | 9/2011 | Gurel ..................... G06F 21/10 713/165 |
| 2011/0265183 | A1* | 10/2011 | Wu ......................... G06F 21/74 718/1 |
| 2012/0204028 | A1 | 8/2012 | Banerjee et al. |
| 2013/0042106 | A1* | 2/2013 | Persaud ............... G06F 21/606 713/165 |
| 2013/0097429 | A1 | 4/2013 | Grandcolas et al. |
| 2014/0019498 | A1 | 1/2014 | Cidon et al. |
| 2014/0189362 | A1 | 7/2014 | Van Den Broeck et al. |
| 2014/0215208 | A1 | 7/2014 | Daly, Jr. et al. |
| 2014/0237252 | A1* | 8/2014 | Hursti ...................... H04L 9/30 713/176 |
| 2014/0338004 | A1* | 11/2014 | Camiel .................. G06F 21/604 726/30 |
| 2014/0359283 | A1* | 12/2014 | Lee ..................... G06F 9/45533 713/165 |
| 2014/0359285 | A1 | 12/2014 | Tanik et al. |
| 2015/0052354 | A1 | 2/2015 | Purohit |
| 2015/0161364 | A1 | 6/2015 | Makarov et al. |
| 2015/0244693 | A1 | 8/2015 | Pate et al. |
| 2016/0036785 | A1 | 2/2016 | Ambroz et al. |
| 2016/0162699 | A1 | 6/2016 | Ryan |
| 2016/0253519 | A1* | 9/2016 | Broumas ............... H04L 9/0866 713/189 |
| 2016/0277374 | A1* | 9/2016 | Reid ................... H04L 63/0435 |
| 2016/0292442 | A1* | 10/2016 | Axnix ................. G06F 12/0802 |
| 2016/0321459 | A1 | 11/2016 | Byszio |
| 2016/0330177 | A1 | 11/2016 | Singleton, IV et al. |
| 2017/0249472 | A1 | 8/2017 | Levy et al. |
| 2017/0344407 | A1* | 11/2017 | Jeon ....................... G06F 21/74 |
| 2017/0372094 | A1* | 12/2017 | Hore ................... H04L 63/0428 |
| 2018/0314837 | A1* | 11/2018 | Testerman ............ G06F 21/602 |

FOREIGN PATENT DOCUMENTS

| | | |
|---|---|---|
| CN | 101741553 A | 6/2010 |
| CN | 101901313 A | 12/2010 |
| CN | 104348846 A | 2/2015 |
| CN | 104579879 A | 4/2015 |
| CN | 104917741 A | 9/2015 |
| CN | 104980477 A | 10/2015 |
| CN | 105071936 A | 11/2015 |
| CN | 107172027 A | 9/2017 |
| CN | 107196932 A | 9/2017 |
| JP | 2001516913 A | 10/2001 |
| JP | 2006503369 A | 1/2006 |
| JP | 2017535843 A | 11/2017 |
| KR | 20130079004 A | 7/2013 |
| WO | 1999014652 A1 | 3/1999 |
| WO | 2004036350 A2 | 4/2004 |
| WO | 2013123548 A2 | 8/2013 |
| WO | 2016054149 A1 | 4/2016 |
| WO | 2017003583 A1 | 1/2017 |

OTHER PUBLICATIONS

Pal et al, Enhancing File Data Security in Linux Operating System by Integrating Secure File System, Apr. 2, 2009, pp. 1-8. (Year: 2009).*
List of IBM Patents or Patent Applications Treated as Related, Jan. 12, 2021, pp. 1-2.
United Kingdom Examination Report for Application No. GB20066911.8 dated Feb. 1, 2022, pp. 1-4.
Response to Examination Report for United Kingdom Application No. GB2006911.8 dated Mar. 17, 2022, pp. 1-8.
International Search Report and Written Opinion of the International Searching Authority for International Application No. PCT/IB2018/057911 dated Jan. 30, 2019, pp. 1-9.
IBM, "IBM Bluemix Catalog," https://console.bluemix.net/catalog/services/key-protect, 2017, pp. 1-3.
IBM, "IBM Cloud: Bluemix," https://www.ibm.com/cloud-computing/bluemix/hardware-security-module, 2017, pp. 1-8.
Dekart, "Dekart Key Manager," https://www.dekart.com/products/card_management/key_manager, 2017, one page.
Virtucrypt, "Remote Key Management," https://www.virtucrypt.com/services/enterprise/remote-key-management, 2017, pp. 1-3.
Satyanarayanan et al., "On the Ubiquity of Logging in Distributed File Systems," Third Workshop on Workstation Operating Systems, IEEE Xplore, 1992, pp. 122-125.
D'Souza et al., "A Low Cost, Highly Reliable Virtual Network Storage System," Systems, Applications and Technology Conference, IEEE Xplore, 2006, pp. 1-7.
Gupta et al., "A Light Weight Centralized File Monitoring Approach for Securing Files in Cloud Environment," The 7th International Conference for Internet Technology and Secured Transactions (ICITST-2012), 2012, pp. 382-387.
Borders et al., "Securing Sensitive Content in a View-Only File System," Proceedings of the ACM Workshop on Digital Rights Management, Alexandria, Virginia, Oct. 30, 2006, pp. 27-36.

* cited by examiner

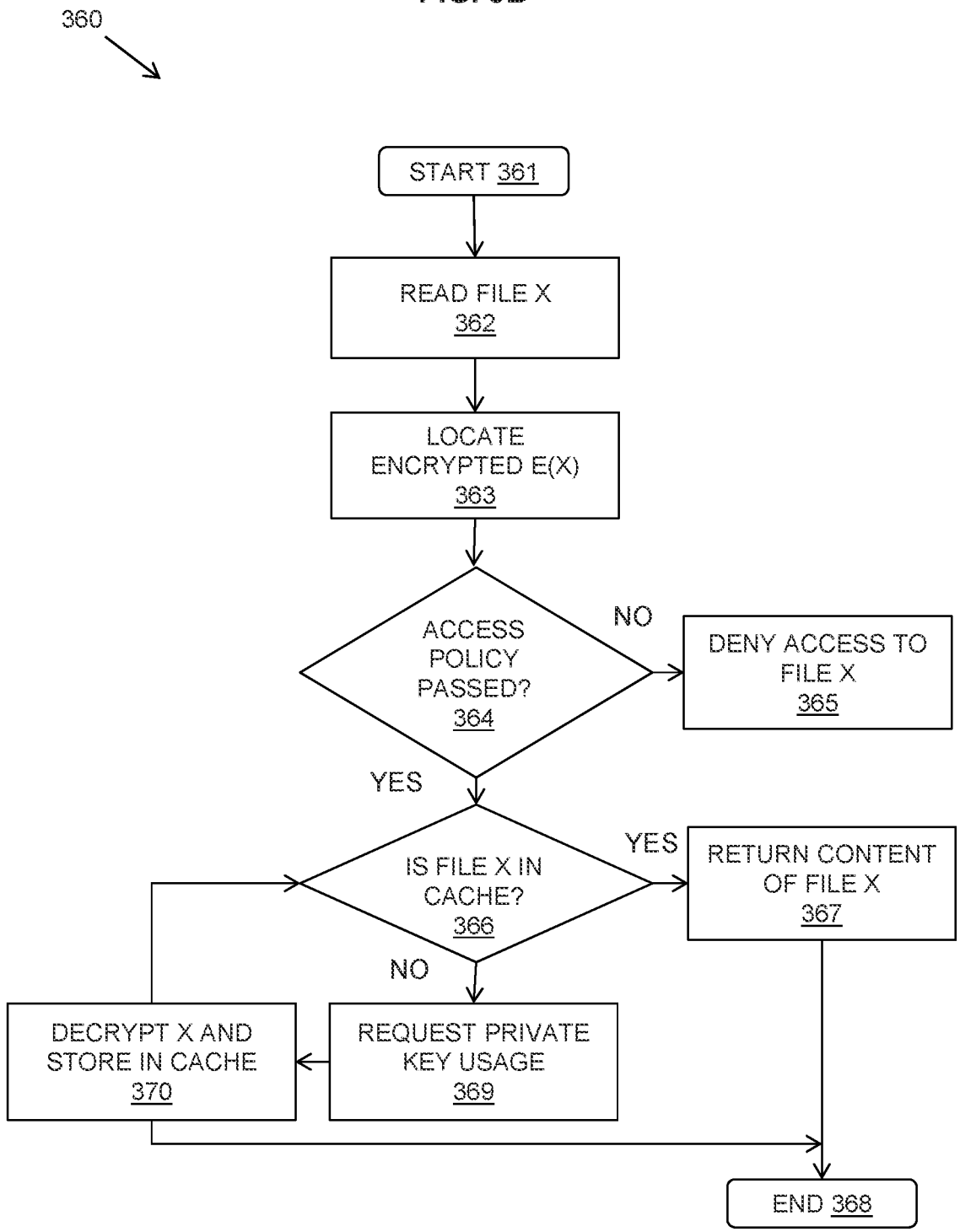

US 11,799,861 B2

SECURE ACCESS MANAGEMENT FOR TOOLS WITHIN A SECURE ENVIRONMENT

TECHNICAL FIELD

The present invention relates generally to secure access management, and more particularly to secure access management for tools within a secure environment.

BACKGROUND

Secure environments may have a secure perimeter in the form of a firewall that prevents unauthorized access based on predetermined security rules. Secure environments may be cloud systems, networked systems, enterprise systems, etc. The secure perimeter may secure an environment in an unlimited number of configurations including, for example, a combination of cloud Infrastructure as a Service (IaaS) or Platform as a Service (PaaS) as well as enterprise networks.

A firewall checks incoming and outgoing packets to filter against access policies and to block malicious traffic and establishes a barrier between a trusted, secure internal network and another outside network that is assumed not to be secure or trusted User access through a firewall of a secure environment may use a machine or virtual private network (VPN) access.

Modern security mechanisms include multi-factor authentication (MFA), which is a method of access control in which a user is granted access only after successfully presenting several separate pieces of evidence to an authentication mechanism. Typically, at least two of the following categories of evidence are used: knowledge (something the user knows); possession (something the user has); and inherence (something the user is).

Modern security mechanisms also include hardware security modules (HSM), which are physical computing devices that safeguard and mange digital keys for strong authentication and provide crypto processing. HSMs are typically in the form of a plug-in card or external device that attaches directly to a computer or network server.

While modern security mechanisms, such as MFA and HSMs, are easy to adopt for user access through the perimeter of a secure environment, they are much harder to use inside the secure environment. Tools such as individual systems, services, or applications within the secure environment may require varying levels of authentication and access control to be performed, which adds multiple different authentication mechanisms, inconsistent support by the tools, and other challenges.

Specifically, it is often required that certain credentials are stored as files in plain text which weakens security and complicates the management.

Some tools have limitations in their use of modern security mechanisms. For example, a tool may support use of certificates for authentication, but may require that a private key for that certificate is provided as a file and cannot be encrypted with a passphrase. This approach is very common across development and operations (DevOps) tools. This effectively means that in order to execute the tool, the private key has to be exposed in a file system and stored between user sessions. This results in unacceptable security exposure.

As a result, it is common that access to systems within the boundary of the secure environment are protected with weaker mechanisms and require additional management.

SUMMARY

In one embodiment of the present invention, a computer-implemented method for secure access management for tools within a secure environment comprises obtaining at a virtual file system an encrypted file stored in the secure environment, where the file holds sensitive data and is encrypted using a public key of a user. The method further comprises intercepting a read operation at the virtual file system of the encrypted file and sending the encrypted file to a client at a user system external to the secure environment over a secure connection for decryption by a remote cryptography device of the user system using the user's private key. The method additionally comprises receiving the decrypted file at the virtual file system enabling the user to run a user command.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 3B is a flow diagram of an example embodiment of a further aspect of a method in accordance with the present invention;

DETAILED DESCRIPTION

Figure 1:
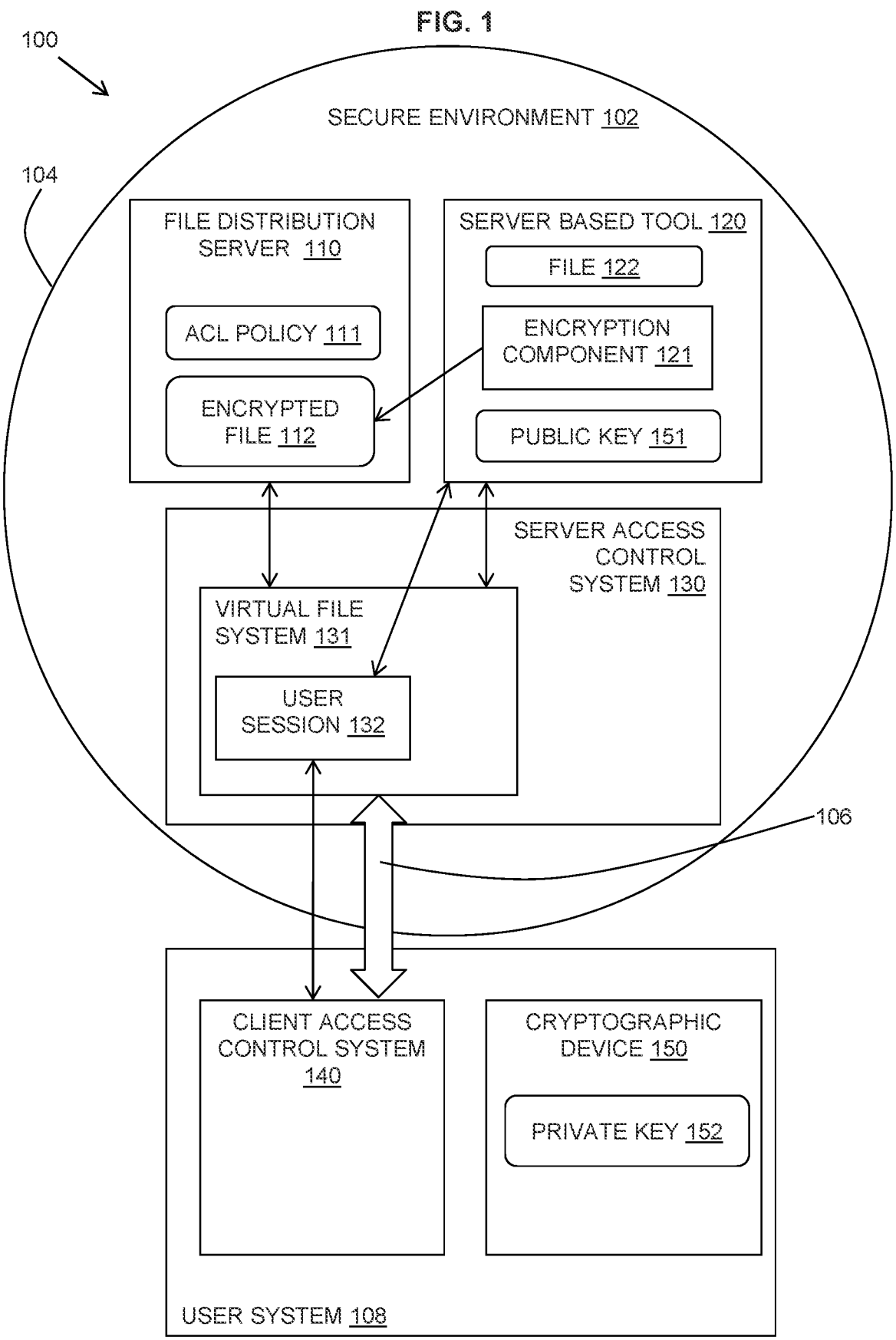
FIG. 1 is a schematic diagram of an example embodiment of a system including a secure environment in which the present invention may be implemented.

According to an aspect of the present invention there is provided a computer-implemented method for secure access management for tools within a secure environment wherein the secure environment has a secure perimeter, the method carried out at a server in the secure environment comprising: accessing a virtual file system for a user in memory on a server side in the secure environment as part of an authenticated user session including a user command instigated by a user; obtaining at the virtual file system an encrypted file stored in the secure environment, wherein the file holds sensitive data and is encrypted using a public key of the user: intercepting a read operation at the virtual file system of the encrypted file and sending the encrypted file to a client at a user system external to the secure environment over a secure connection for decryption by a remote cryptography device of the user system using the user's private key; and receiving the decrypted file at the virtual file system enabling the user to run the required user command.

The method provides a virtual file system that interfaces between stored encrypted sensitive data and user commands to a tool in the secure environment. Sensitive data for use in authentication or other uses may be generated and used securely for each user with the user's private key that does not leave the user's cryptographic device.

The virtual file system may be generated for each user session or may be a central virtual file system that is user aware and may be provided by a software interface for a computer operating system for creating virtual file systems in user space.

The method may include receiving the user command from a user system external to the secure environment to carry out the read operation of the encrypted file and the user command may be directed to the server from a tool to which the command is directed.

The method may include verifying access permissions of the user according to stored access permissions in the secure environment, wherein the access permissions for an encrypted file may be stored and accessed in association with an encrypted file.

The method may include storing encrypted files in a central repository of encrypted files for multiple tools within the secure environment. In one embodiment, the method may include downloading encrypted files from a central repository to the virtual file system for a user prior to the user session. In another embodiment, the method may include syncing an encrypted file from the central repository to the virtual file system in response to the user command to the tool and locating the encrypted file by redirection by the tool.

Intercepting a read operation may activate a secure channel to the user system, such as Secure Shell (SSH) cryptographic network protocol using socket forwarding.

The method may include caching the decrypted file in the virtual file system for a predefined temporary period and may further include checking for cached decrypted files before sending the encrypted file to a client at the user system external to the secure environment.

The method may include managing encrypted files stored in the secure environment including generating the encrypted files on behalf of a tool, updating the files, and/or auditing the use of the files.

According to another aspect of the present invention there is provided a computer-implemented method for secure access management for tools within a secure environment wherein the secure environment has a secure perimeter, the method carried out at a client external to the secure environment comprising: requesting execution of a command at a server in the secure environment as part of an authenticated session of the user, wherein the request instigates the accessing of a virtual file system for a user in memory on a server side in the secure environment as part of the authenticated user session; receiving over a secure connection from the virtual file system in the secure environment an encrypted file stored in the secure environment, wherein the file holds sensitive data and is encrypted using a public key of the user; decrypting the encrypted file with a cryptography device of the user external to the secure environment using the user's private key; and forwarding the decrypted file to the virtual file system enabling the user to run the required user command.

According to another aspect of the present invention there is provided a system for secure access management for tools within a secure environment wherein the secure environment has a secure perimeter, the system being provided in a secure environment and comprising: a processor and a memory configured to provide computer program instructions to the processor to execute the function of components; a virtual file system for a user being accessed in memory on a server side in the secure environment as part of an authenticated user session including a user command instigated by a user; a file request component for obtaining at the virtual file system an encrypted file stored in the secure environment, wherein the file holds sensitive data and is encrypted using a public key of the user; a file read intercept component for intercepting a read operation at the virtual file system of the encrypted file; a file exporting component for sending the encrypted file to a client at a user system external to the secure environment over a secure connection for decryption by a remote cryptography device of the user system using the user's private key; and a file return component for receiving the decrypted file at the virtual file system enabling the user to run the required user command.

The virtual file system may be provided by a software interface for a computer operating system for creating virtual file systems in user space and may be generated for each user session or may be a central virtual file system that is user aware.

The system may include a user command receiving component for receiving the user command from a user system external to the secure environment to carry out the read operation of the encrypted file, wherein the user command is directed to the server from a tool to which the command is directed.

The system may include a file access policy component for verifying access permissions of the user according to stored access permissions in the secure environment, wherein the access permissions for an encrypted file are stored and accessed in association with an encrypted file.

The system may include a central repository of encrypted files for multiple tools within the secure environment.

The system may include a file location component for receiving a user command to a tool in the secure environment and locating a relevant encrypted file by redirection by the tool.

The file read intercept component for intercepting a read operation may activate a secure channel to the user system.

The system may include a file caching component for caching the decrypted file in the virtual file system for a predefined temporary period and a cache checking component for checking for cached decrypted files before activating the file exporting component for sending the encrypted file to a client at the user system external to the secure environment.

The system may include a sensitive data file management system for storing and managing encrypted files and access permissions in the secure environment including generating the encrypted files on behalf of a tool, updating the files periodically, and/or auditing the use of the files.

The secure environment may be formed of or include a cloud infrastructure.

According to another aspect of the present invention there is provided a system for secure access management for tools within a secure environment wherein the secure environment has a secure perimeter, the system being provided external to the secure environment and comprising: a user system including a processor and a memory configured to provide computer program instructions to the processor to execute the function of components; a command component requesting execution of a command at a server in the secure environment as part of an authenticated session of the user, wherein the request instigates the access of a virtual file system for a user in memory on a server side in the secure environment as part of the authenticated user session; an encrypted file receiving component for receiving over a secure connection from the virtual file system in the secure environment an encrypted file stored in the secure environment, wherein the file holds sensitive data and is encrypted using a public key of the user; a cryptographic device accessing component for decrypting the encrypted file with a cryptographic device of the user external to the secure environment using the user's private key; and a decrypted file returning component for forwarding the decrypted file to the virtual file system enabling the user to run the required user command.

According to another aspect of the present invention there is provided a computer program product for secure access management for tools within a secure environment wherein the secure environment has a secure perimeter, the computer program product comprising a computer readable storage medium having program instructions embodied therewith, the program instructions executable by a processor to cause the processor to: access a virtual file system for a user in memory on a server side in the secure environment as part of an authenticated user session including a user command instigated by a user; obtain at the virtual file system an encrypted file stored in the secure environment, wherein the file holds sensitive data and is encrypted using a public key of the user; intercept a read operation at the virtual file system of then encrypted file and sending the encrypted file to a client at a user system external to the secure environment over a secure connection for decryption by a remote cryptography device of the user system using the user's private key; and receive the decrypted file at the virtual file system enabling the user to run the required user command.

A method and system are provided for controlling sensitive data stored in files required for use of tools within a secure environment by storing the sensitive data only in an encrypted form in the secure environment using a user's public key and holding a user's private key in a remote cryptography device outside the secure environment.

The sensitive data may be access secrets such as cryptographic keys, user credentials or passwords. Other types of sensitive data may be documents or any form of data that may be stored in a file.

Public key cryptography, or asymmetrical cryptography, is any cryptographic system that uses pairs of keys: public keys that may be disseminated widely; and private keys that are known only to the owner. This accomplishes two functions: authentication, which is when the public key is used to verify that a holder of the paired private key sent the message; and encryption, whereby only the holder of the paired private key can decrypt the message encrypted with the public key.

A secure environment may be any group of computer systems that have a secure perimeter in the form of a network security system such as a firewall that prevents unauthorized access based on predetermined security rules. Secure environments may include interconnected systems including cloud systems, networked systems, enterprise systems, etc. or a combination thereof. A computer system may be a server, storage system, etc.

Protected tools within the secure environment may include applications, services, systems, utilities, clusters of distributed applications, etc. running on servers or other networked computer systems that may require user credentials for access and use of the tools.

In the described method and system, a secure access system is provided, including a virtual file system provided on a server in the secure environment, that links file access with a private key owned by a user. Files of sensitive data are generated in the secure environment and stored only in an encrypted form using the user's public key to achieve the encryption. The private key operations are performed on the user's system using a cryptography device remote to the secure environment. The server that is hosting the virtual file system within the secure environment never has access to the private key.

The secure access system is provided deployed on a server in the secure environment and connected to by a user via their computer system external to the secure environment via a secure connection through the firewall of the secure environment.

The virtual file system may be created in memory on the server side of the secure access system as part of an authenticated user session of a protected tool provided by a server in the secure environment. A virtual file system is created for each user since a user specific decryption key is used for each virtual file system. This prevents a user having access to each other's data in the virtual file system.

In order for the authenticated user to run a command on the server in the secure environment, an authorization check must succeed and the authorization check must have access to the file for that user in a decrypted form.

An encrypted file for the server providing the required tool in the secure environment is stored in the secure environment and is copied to the virtual file system when it is needed by a user. An authorization check attempts to read it and to verify the permissions. A read from the virtual file system is intercepted. The interception may be via socket forwarding (for example, GNU Privacy Guard (GPG)).

The encrypted file being accessed is sent to a client side of the secure access system over a secure connection for decryption by the remote cryptography device using the user's private key. The decrypted file is sent back to the virtual file system and used to check the authorization to allow the user to run the required command. The decrypted file is only ever held in the virtual file system temporarily and the private key never leaves the remote cryptography device.

The described method and system provide an effective and secure authorization mechanism for low level commands and programs used to administer servers within a secure environment. It allows use of private keys held outside the secure environment in the context of a file system access within the secure environment (for example, within a cloud system).

FIG. 1 is a schematic diagram of a system 100 in which the described secure access management system may be implemented. The system 100 includes a secure environment 102 with a secure perimeter 104 provided by a firewall. The secure environment may include multiple interconnected servers 110, 120, 130 and other systems that may be provided in a local environment or may be distributed across remote locations. In one example, the secure environment 102 is a cloud environment; however, other combinations of networked environments, enterprise environments, cloud environments, or combinations thereof may comprise the secure environment 102.

A user system 108 may be provided outside the secure perimeter 104 and may access the secure environment via a secure connection or channel 106. In one embodiment, the secure channel is a Secure Shell (SSH) cryptographic network protocol that uses socket forwarding that forwards a GPG agent's socket. However, any other secure channel that allows remote system to access user's private key on their workstation may be used.

The user system 108 may include or have access to a cryptographic device 150 for storing and managing the user's cryptographic key pair in the form of a public key 151 that is distributed to tools 120 based on servers within the secure environment 102 and a private key 152 that does not leave the cryptographic device 150.

An HSM is a physical computing device that safeguards and manages digital keys for strong authentication and provides crypto processing. HSMs are typically in the form of a plug-in card or external device that attaches directly to a computer or network server. Functions of HSMs include: onboard secure cryptographic key generation; onboard secure cryptographic key storage and management; use of cryptographic and sensitive data material; offloading application servers for complete asymmetric and symmetric cryptography.

A server based tool 120 in the secure environment 102 may require secure data of a file for authentication of a user of the services or application provided by the server 120. The tool 120 may generate a file 122 of the sensitive data, which may be encrypted using an encryption component 121 with a public key 151 of a user. A separate secure provisioning workstation may be used to centralize secret generation and encryption for each tool.

A file distribution server 110 may be provided in the secure environment 102 for centrally storing encrypted files 112 generated by multiple server based tools 120 within the secure environment 102. The file distribution server 110 may be in the form of network-attached storage (NAS), Lightweight Directory Access Protocol (LDAP), or hosted file storage on the cloud. The file distribution server 110 may also store access control list (ACL) policies 111 defining users or groups of users who may access the tool 120.

An access control system 130, 140 is provided comprising a server access control system 130 provided in the secure environment 102 and a client access control system 140 provided at a user system 108 external to the secure environment. A user session 132 is activated when a user attempts to access a server 120 in the secure environment 102 providing a service or application required by the user.

The access control system 130, 140 includes a virtual file system 131 that interfaces between the file distribution server 110 with the centrally stored files encrypted with users' public keys and the users' private keys stored on user's cryptographic devices 150. A virtual file system 131 may be implemented by hooking into the underlying capabilities exposed by the operating system. For example, Filesystem in Userspace (FUSE) is a Unix-like (Unix is a trade mark of The Open Group) computer operating system that enables users to create their own file systems without editing kernel code. This is achieved by running file system code in user space with the FUSE module providing a bridge to the actual kernel interfaces.

The virtual file system 131 may implement such an interface to intercept a reading operation for a specific file, inject the logic of decrypting the file, and as a normal file for consumption. The communication between the virtual file system 131 and the user's cryptographic device 150 is carried out using the secure channel 106.

Figure 2A:
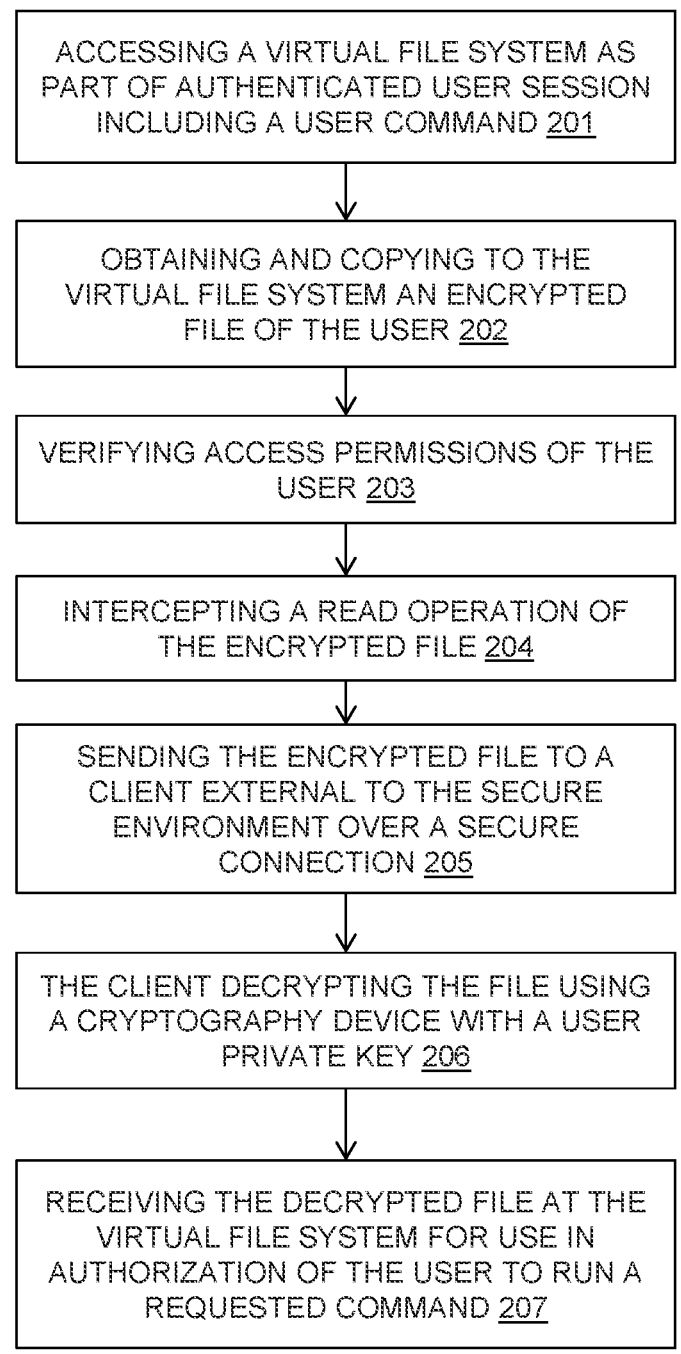
FIG. 2A is a flow diagram of an example embodiment of an aspect of a method in accordance with the present invention carried out at a secure environment.

Referring to FIG. 2A, a flow diagram 200 shows an example embodiment of a method for secure access management for systems within a secure environment in which the secure environment has a secure firewall perimeter. The method of the flow diagram 200 is carried out at a server 130 in the secure environment hosting an access control system.

User credentials in the form of files may be provided for various tools, for example, in the form of services, applications, etc., hosted by servers in the secure environment and may be encrypted with a public key of a user's key pair. The encrypted file may be transferred and stored into a file distribution server in the secure environment.

A separate secure provisioning workstation may be used to centralize secret generation and encryption for each tool, and upload encrypted data to a file distribution server such as network-attached storage (NAS), Lightweight Directory Access Protocol (LDAP), or hosted file storage on the cloud. All data is encrypted before being transferred.

The method may access 201 a virtual file system in memory on a server side in the secure environment as part of an authenticated user session including a user command instigated by a user. The virtual file system may be started for each user session or may be a central virtual file system that is user aware.

The user command may be a login by the user to a tool in the secure environment providing a service or application, etc. required by the user. The user session may attempt to access sensitive information or credentials through the virtual file system by making a request for content of a file. The user command may be directed to the access control system by the tool in the secure environment making outbound communication (for example, an Hyper Text Transfer Protocol Secure (HTTPS) request) to the server access control system.

An encrypted file stored in the secure environment is obtained and copied 202 to the virtual file system. The encrypted file may be stored in a central repository of encrypted files for authentication on a plurality of systems in the secure environment. The files are encrypted using a public key of a user.

Verifying 203 access permissions of a user may be carried out by referencing access control permissions that may be stored in the same central repository as the encrypted files in the secure environment or in a separate access control permissions repository.

The method may intercept 204 a read operation from the virtual file system of an encrypted file and may send 205 the encrypted file to a client external to the secure environment over a secure connection for decryption by a remote cryptography device of the user using the user's private key.

In one embodiment, the secure connection may use SSH with GPG socket forwarding. The virtual file system may call the GPG program on the server where it is running and the GPG program may accesses the GPG agent at the user system. This communication is done by the GPG program accessing a specific UNIX socket in the server system's file system. That socket is forwarded using SSH socket forwarding functionality. That means that the socket on the server system is mirroring the socket on the user's system. This, in turn, means that through socket forwarding the GPG on the server system accesses the GPG agent on the user's system.

Through this secure channel, the GPG program on the server system can perform private key operations such as decryption 206, with the private key being stored on the user's system and not being exposed to the remote server system.

The method may receive 207 the decrypted file at the virtual file system for use in authorization of the user to run the required user command. The decrypted file may be held by the virtual file system for a temporary period in a cache to enable the decrypted file to be used repeatedly in an authenticated user session.

Figure 2B:
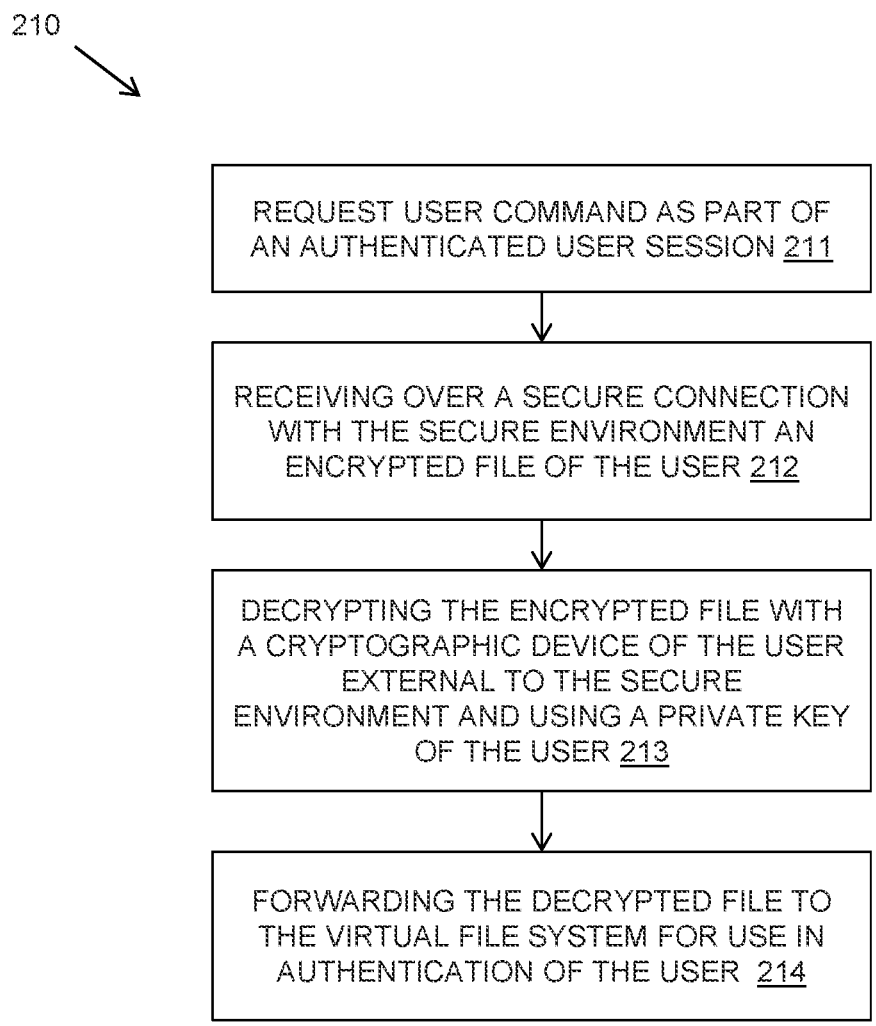
FIG. 2B is a flow diagram of an example embodiment of an aspect of a method in accordance with the present invention carried out at a user external to a secure environment.

Referring to FIG. 2B, a flow diagram 210 shows an example embodiment of a method for secure access management for systems within a secure environment in which the secure environment has a secure firewall perimeter. The method of the flow diagram 210 is carried out at a client external to the secure environment at a user system 108.

A command line interface at a user system may request 211 execution of a command at a server in the secure environment as part of an authenticated session of the user. The request may instigate the access of a virtual file system in memory on a server side in the secure environment as part of the authenticated user session as described in relation to FIG. 2A.

As part of the authentication, the user system may receive 212, over a secure connection from the virtual file system in the secure environment, an encrypted file as stored in the secure environment. The file is encrypted using a public key of the user.

The user system may decrypt 213 the encrypted file with a cryptography device of the user external to the secure environment and using the user's private key. The decrypted file may be forwarded 214 to the virtual file system for use in authorization of the user to run the required user command.

Figure 3A:
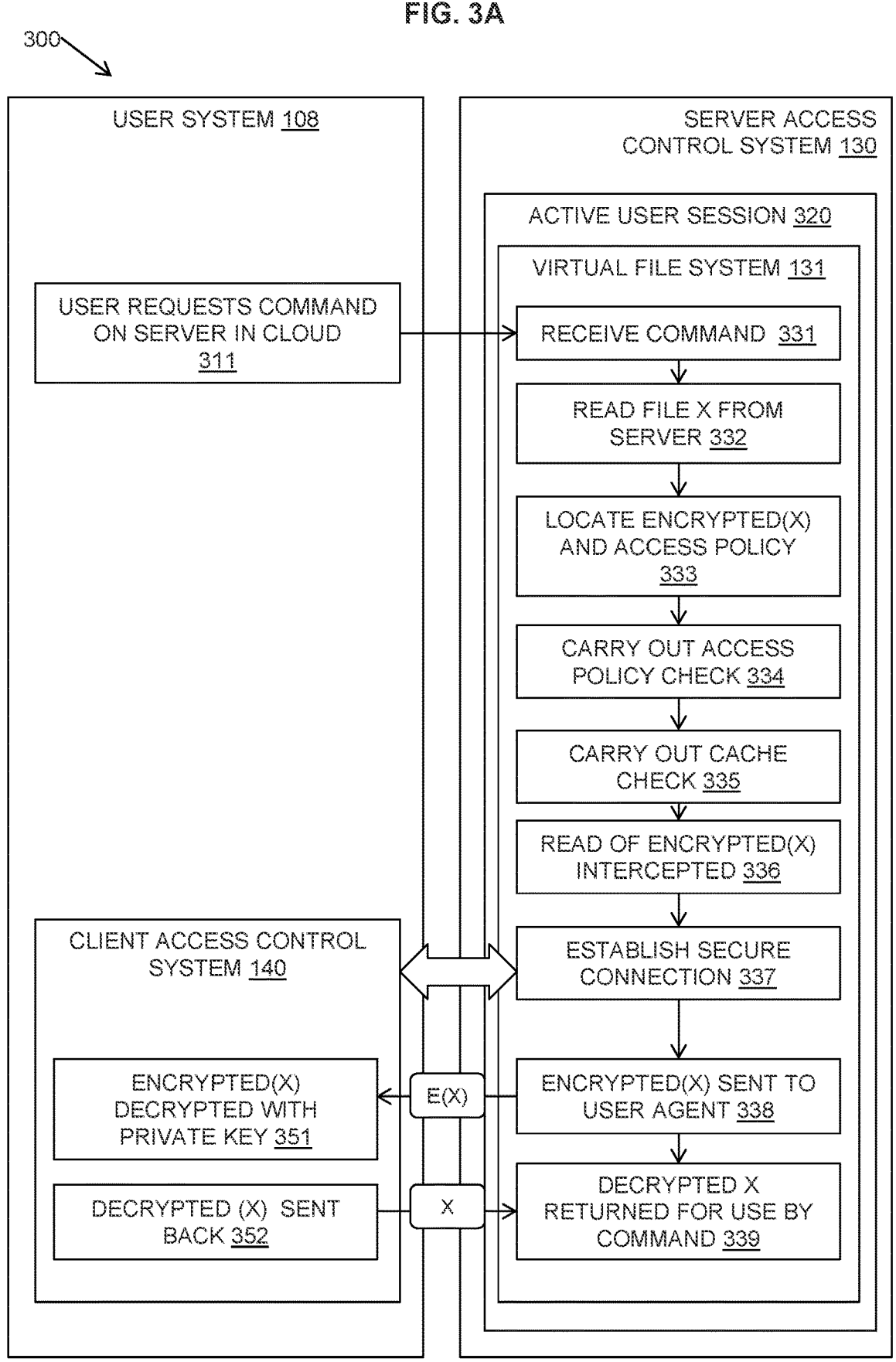
FIG. 3A is a swim-lane flow diagram of an example embodiment of an aspect of a method in accordance with the present invention.

Referring to FIG. 3A, a swim-lane flow diagram 300 shows an example embodiment of the described method carried out between a server access control system 130 in a secure environment and a user system 108.

A command line interface at the user system 108 may request 311 execution of a command at a tool at a server in the secure environment as part of an authenticated session of the user. The tool in the secure environment may make an outbound communication (for example, a Hyper Text Transfer Protocol Secure (HTTPS) request) to the server access control system 130. The server access control system 130 may have or create an active user session 320 with a virtual file system 131 which receives 331 the user command.

The command may attempt to read 332 sensitive data in a file X from the access control system 130 in the secure environment.

The method may locate 333 an encrypted version of the file E(X) and an access policy for the file X.

The encrypted version of the file and the access policy may be held in a central repository in the secure environment for multiple servers. The encrypted sensitive data may be pre-downloaded from a central repository, such as a file distribution server 110, to the virtual file system 330 for a user. Alternatively, and may be located by being redirected to the central repository by the tool to which the command is addressed. The command always executes in the secure environment. The encrypted version of the file and access policy may be referenced directly to the central repository or synced from central repository down to the secure environment.

The server access control system 130 may carry out a policy check 334 to ensure that the user from whom the command originated has permission to access the file or carry out the requested command. The server access control system 130 may also carry out a check 335 of cached decrypted files at the server access control system 130. If the requested file is cached in its decrypted form, then the method may use the cached file. Further details of this aspect are described in relation to FIG. 3B.

If the user has permission to access the file and no cached decrypted version is found, the server access control system 130 may intercept 336 a read of the encrypted file E(X) and establish a secure connection 337 to the user system 108 instigating the command 311. The secure connection may connect to a client access control system 140 at the user system 108.

The server access control system 130 may send 338 the encrypted file E(X) to the client access control system 140 where it may be decrypted 351 with a user's private key by a cryptographic device of the user. The cryptographic device, for example a HSM, may be part of the user system 108 or attachable to it as an additional hardware device. The decrypted file X may be sent 352 back to the server access control system 130 where it may be received 339 and used for execution of the user command 311.

Referring to FIG. 3B, a flow diagram 360 provides further details of an example embodiment of the functionality carried out at the server access control system 130 using a virtual file system when handling a command for a file X.

A command line tool attempts to authenticate with a tool at a server by using credentials stored in file X. Only an encrypted form of file X is stored on a permanent storage device in the secure environment.

The method may start 361 and may be triggered by requesting a read 362 of the content of file X at a specific path. The corresponding encrypted file E(X) may be located 363 and verified.

The next step is to apply policy for the usage of file X. For example, a read operation may be allowed to get the content of the file, while copying or modification of the file may be denied. It may be determined 364 if the access policy for the file is passed by the read. If the access policy fails, the read is denied 365 access to the file X.

If the access policy passes, it may be determined 366 if file X is cached in a cache at the virtual file system and a lookup in the cache may be performed. The cache keeps a list of decrypted files along with their expiration time. If a cached copy of file X is found, the content of file X may be returned 367 immediately in response to the read and the method may end 368.

If there is no cached copy of file X, the method may request the remote private key usage 369 as described in relation to FIG. 3A.

Decrypting of the encrypted file E(X) requires the decryption key, which is private and only available to the user that is interacting with the command line tool.

Once the decrypted file X is received at the virtual file system, file X is cached 370 for a predetermined temporary period for consumption for use by other reads in the user session and the method may end 368.

The virtual file system may restrict or hide access to the plaintext version of the file X in the cache.

In one example embodiment, a command line interface runs commands against a cluster application program interface (API) server for application containers that run across a cluster of physical machines. The cluster may provide compute power, networking, and storage through a set of organized worker nodes that keep applications running in a highly available manner. For example, the cluster may be Kubernetes with a Kubernetes API server and the command line interface may be kubectl (Kubernetes is a trade mark of The Linux Foundation).

The command line interface of a user workstation may require authentication including, for example, a pair of certificates and a secret credential to authenticate with the remote cluster API server. Both certificates and secret credential may exist in the form of a file system and are referenced by the configuration of the command line interface.

The user may issue a command to the command line interface. The command line interface may attempt to read the secret credential. The virtual file system may intercept the read operation of the secret credential and send encrypted form of the secret credential via GPG to the user workstation. The secret credential may get decrypted on the user workstation and sent back to the virtual file system. The virtual file system may return the secret credential to the command line interface, which may send out a HTTPS request with the secret credential to API server and return the result to the user.

User credentials may be periodically updated in a way that is transparent to the user and updated encrypted files may be stored in the central repository in the secure environment.

The access policies may include any combination of rules related to a file including the system for which the credential stored in the file was generated, processes that have access to the file, time of day, user remote location, and so forth.

The virtual file system may provide an auditing capability to register any usage of the credential, simplifying or filling the gaps in auditing of the service that requires credential access. Eventually, by binding auditing to usage of credentials it may provide auditing for privileged operations.

The described system integrates credential management, personal encryption keys, and a virtual file system. It allows an encrypted file to be distributed securely in the system whilst keeping credential data, such as private keys, as files on a user system.

This approach greatly simplifies credential management. A credential may be generated without user's involvement, encrypted using known user public keys, and stored in a central location as an encrypted file. This means that all the credentials are stored inside a secure perimeter and do not require an additional mechanism to protect their confidentiality. The only external value in the entire generation and usage flow is a user's private key that can be stored securely on a hardware cryptographic device.

Figure 4A:
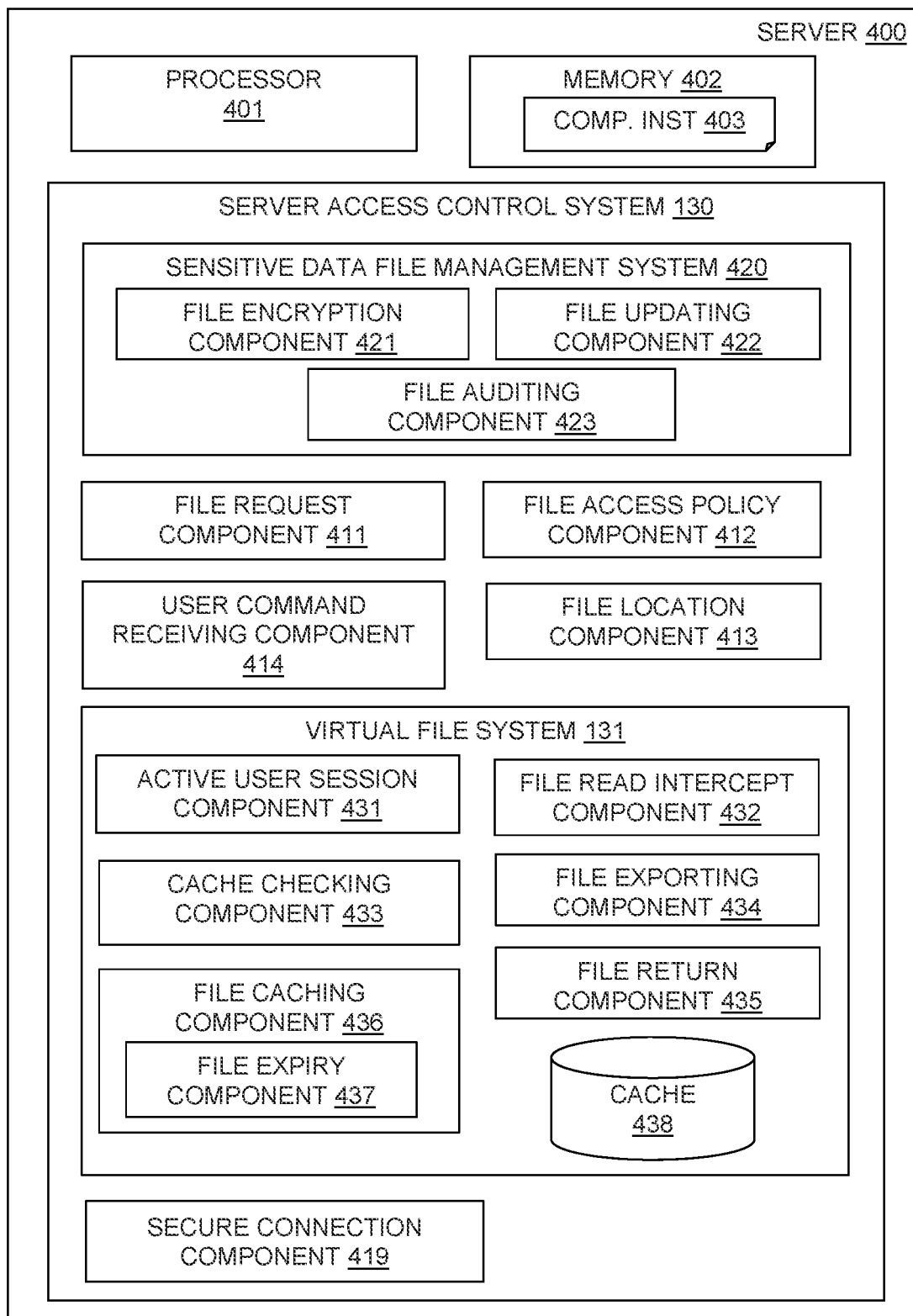
FIG. 4A is block diagram of an example embodiment of a system in accordance with the present invention at the secure environment.

Referring to FIG. 4A, a block diagram shows an example embodiment of a server access control system 130 that may be provided on a server 400 including at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the described components.

The server access control system 130 includes or has access to a virtual file system 131 that is accessed in memory as part of an authenticated user session and may include an active user session component 431 that is activated following a user command instigated by a user.

The server access control system 130 may include a user command receiving component 414 for receiving a user command from a user system external to the secure environment to carry out a read operation of an encrypted file, the user command having been directed to the server access control system 130 from a tool to which the command is directed.

The server access control system 130 may include a file request component 411 for obtaining and copying to the virtual file system 131 an encrypted file stored in the secure environment in a central repository of encrypted files for multiple tools within the secure environment. The encrypted file may hold sensitive data and is encrypted using a public key of a user.

The file request component 411 may use a file location component 413 to locate the encrypted file at the central repository by being redirected to the central repository by the server hosting the tool to which the command is addressed.

A file access policy component 412 may be provided for verifying access permissions of the user according to stored access permissions in the secure environment. The access permissions for encrypted files may also be stored at the central repository.

The virtual file system 131 may have components that operate in conjunction with operations in the virtual file system 131 including a file read intercept component 432 for intercepting a read operation from the virtual file system 131 of an encrypted file. The file read intercept component 432 may activate a secure channel using a secure connection component 419, for example, using socket forwarding.

The virtual file system 131 may include a file exporting component 434 for sending the encrypted file to a client system 108 external to the secure environment over the secure channel for decryption by a remote cryptography device of the user using the user's private key. The virtual file system 131 may include a file return component 435 for receiving at decrypted file at the virtual file system 131 from the client system 108 for use in authorization of the user to run the required user command.

The virtual file system 131 may include a file caching component 436 for caching the decrypted file in a cache 438 of the virtual file system 131 for a predefined temporary period that may be governed by a file expiry component 437. The virtual file system 131 may include a cache checking component 433 for checking for cached decrypted files before activating the file exporting component 434 for sending the encrypted file to a client external to the secure environment.

The server access control system 130 may include a sensitive data file management system 420 for storing and managing encrypted files and access permissions in the secure environment. The management system 420 may include a file encryption component 421 for generating the encrypted files on behalf of a tool, a file updating component 422 for updating the files periodically, and a file auditing component 423 for auditing the use of the files by users.

Figure 4B:
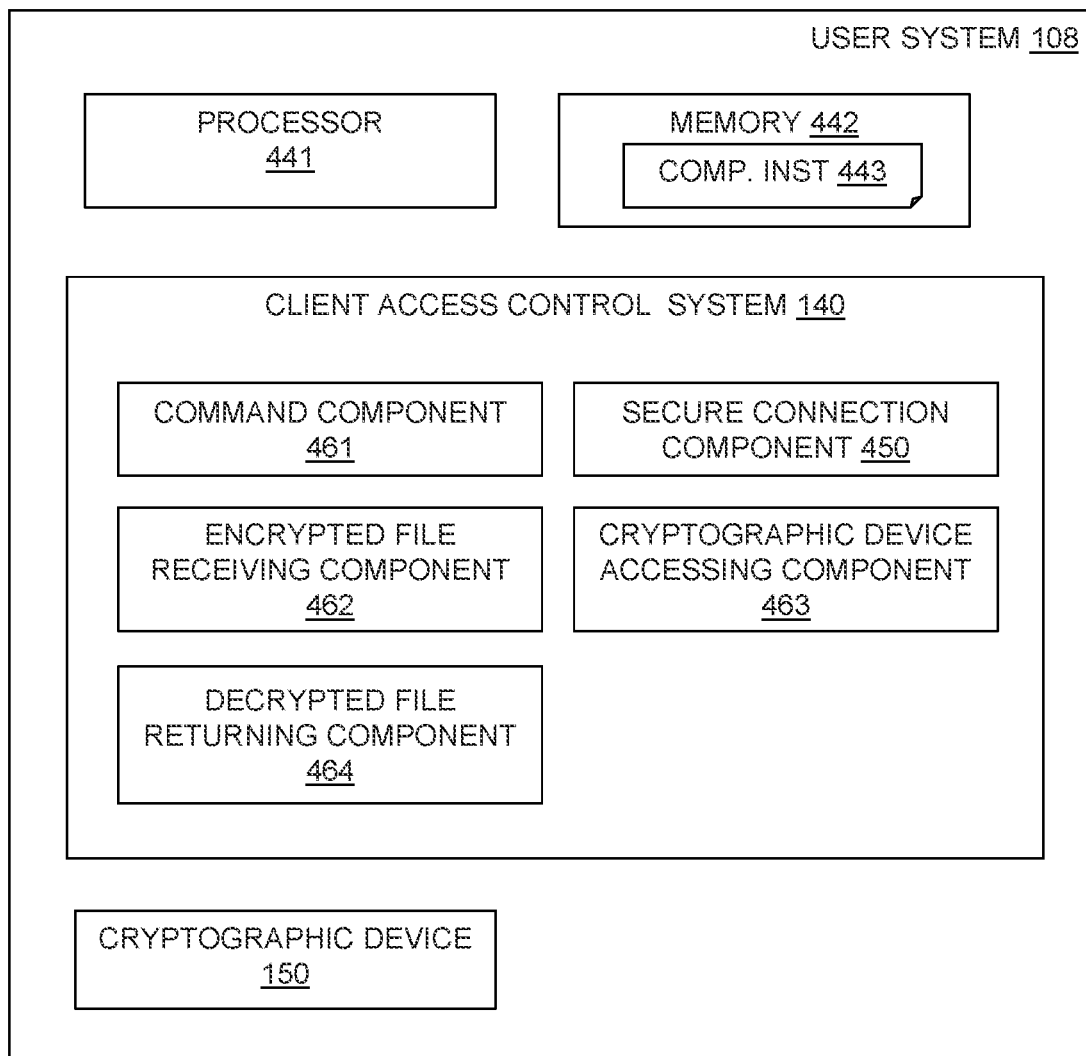
FIG. 4B is block diagram of an example embodiment of a system in accordance with the present invention at the user system external to the secure environment.

Referring to FIG. 4B, a block diagram shows an example embodiment of a client access control system 140 that may be provided on a user system 108 including at least one processor 441, a hardware module, or a circuit for executing the functions of the described components which may be software units executing on the at least one processor. Multiple processors running parallel processing threads may be provided enabling parallel processing of some or all of the functions of the components. Memory 442 may be configured to provide computer instructions 443 to the at least one processor 441 to carry out the functionality of the described components. The client system 108 may include or have connected to it a cryptographic device 150 such as an HSM.

The client access control system 140 may include a command component 461 for requesting execution of a command at a server in the secure environment as part of an authenticated session of the user, wherein the request instigates the access of a virtual file system in memory on a server side in the secure environment as part of the authenticated user session.

The client access control system 140 may include a secure connection component 450 for establishing a secure channel from the server access control system 130 and virtual file system 131 in the secure environment to the client system 108. The client access control system 140 may include an encrypted file receiving component 462 for receiving an encrypted file that holds sensitive data and is encrypted using a public key of a user via the secure channel.

The client access control system 140 may include a cryptographic device accessing component 463 for accessing the cryptographic device 150 and decrypting a received encrypted file using the user's private key.

The client access control system 140 may include a decrypted file returning component 464 for forwarding the decrypted file to the server access control system 130 and virtual file system 131 for use in authorization of the user to run the required user command.

The system may be deployed to support infrastructure of a cloud offering behind a firewall. The server access control system 130 and virtual file system 131 may be deployed on a management console machine inside the cloud infrastructure. An operator may connect to the management console machine from their provided workstation via a client access control system 140 and the access control system may operate on the two machines simultaneously.

When providing infrastructure access for operators it is desirable to use single multi-factor and hardware supported authentication mechanisms for every element of the system that DevOps personnel can use. However, it is difficult to protect access to privileged tools that personnel may use inside the system on remote machines. Typically, simplifying access management, such as usage of certificates, required storing access credentials such as private keys on the remote system. Using weaker authentication such as passwords complicated the management. The described method and system address these issues.

Figure 5:
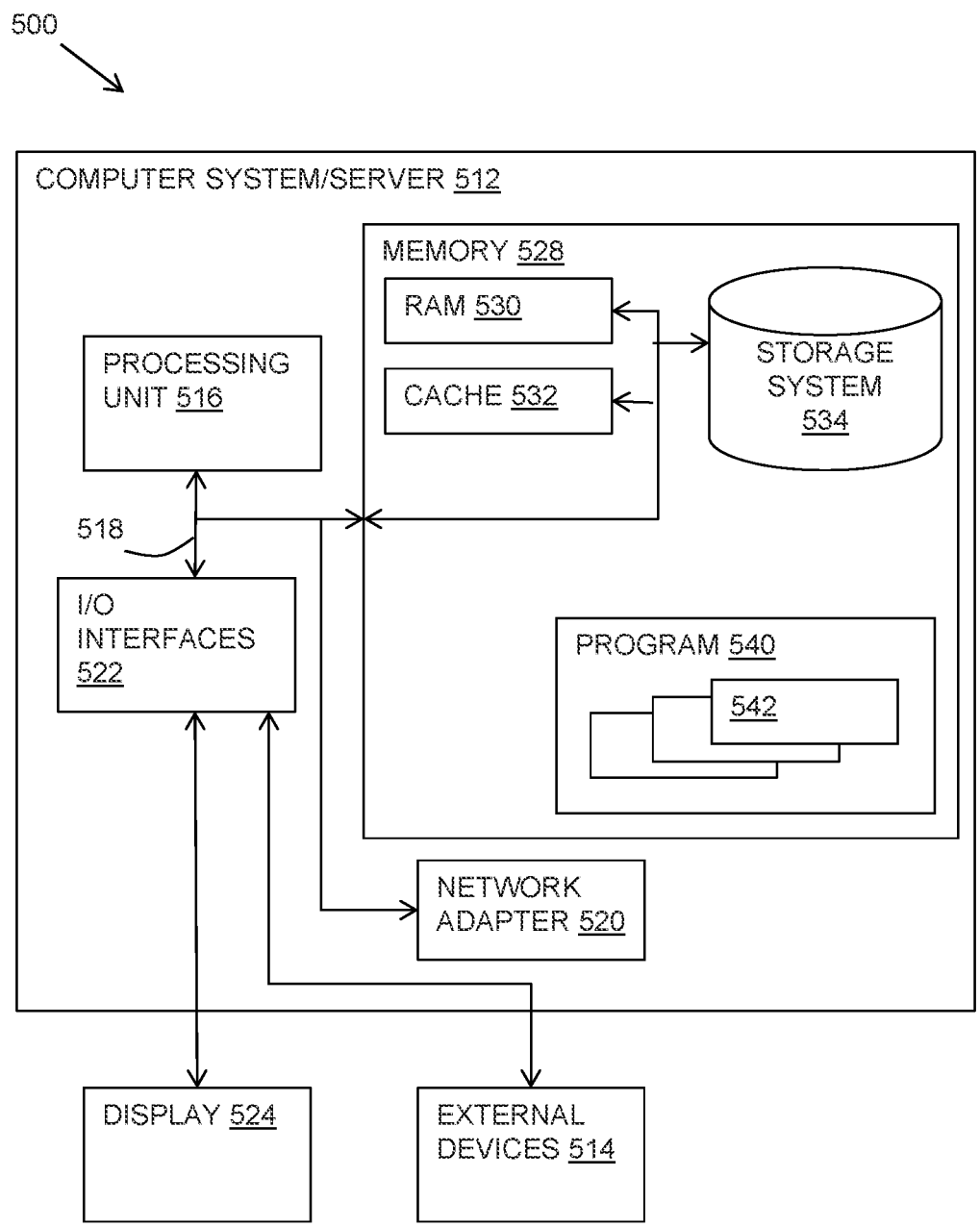
FIG. 5 is a block diagram of an embodiment of a computer system or cloud server in which the present invention may be implemented.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics areas follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
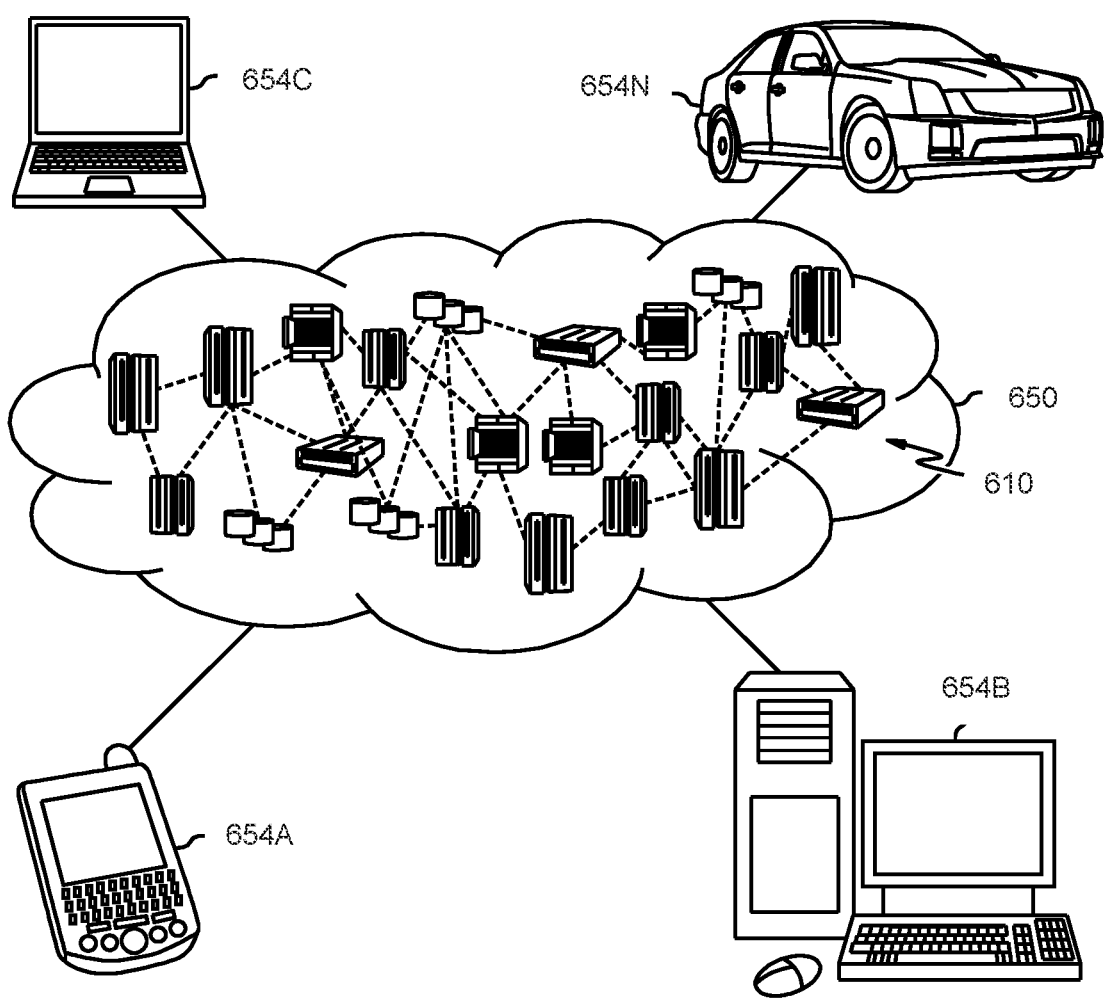
FIG. 6 is a schematic diagram of a cloud computing environment in which the present invention may be implemented.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
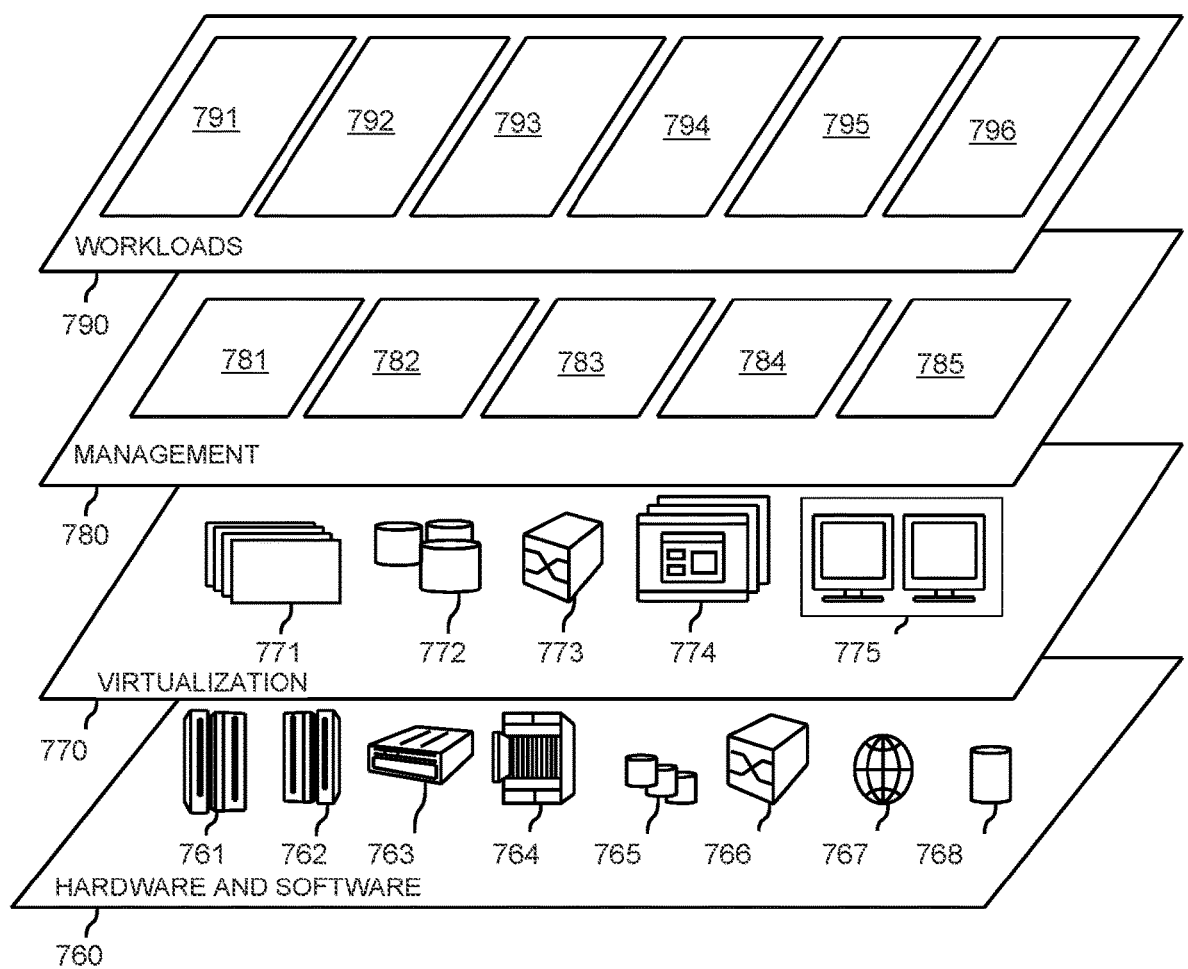
FIG. 7 is a diagram of abstraction model layers of a cloud computing environment in which the present invention may be implemented.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and secure access management processing and management of sensitive information 796.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The invention claimed is:

1. A computer program product for secure access management for tools within a secure environment, the computer program product comprising one or more computer readable storage mediums having program code embodied therewith, the program code comprising programming instructions for:

obtaining at a virtual file system an encrypted file stored in the secure environment, wherein the file holds sensitive data and is encrypted using a public key of a user;

intercepting a read operation at the virtual file system of the encrypted file and sending the encrypted file to a client at a user system external to the secure environment over a secure connection for decryption by a remote cryptography device of the user system using the user's private key; and receiving the decrypted file at the virtual file system enabling the user to run a user command.

2. The computer program product as recited in claim 1, wherein the virtual file system is generated for each user session or is a central virtual file system that is user aware and is provided by a software interface for a computer operating system for creating virtual file systems in user space.

3. The computer program product as recited in claim 1, wherein the program code further comprises the programming instructions for:

receiving the user command from the user system external to the secure environment to carry out the read operation of the encrypted file, wherein the user command is directed to a server from a tool to which the command is directed.

4. The computer program product as recited in claim 1, wherein the program code further comprises the programming instructions for:

verifying access permissions of the user according to stored access permissions in the secure environment, wherein the access permissions for the encrypted file are stored and accessed in association with the encrypted file.

5. The computer program product as recited in claim 1, wherein the program code further comprises the programming instructions for:

storing encrypted files in a central repository of encrypted files for multiple tools within the secure environment, wherein the encrypted files are encrypted with public keys of users of the tools.

6. The computer program product as recited in claim 5, wherein the program code further comprises the programming instructions for:

downloading encrypted files from the central repository to the virtual file system for the user prior to a user session.

7. The computer program product as recited in claim 5, wherein the program code further comprises the programming instructions for:

syncing an encrypted file from the central repository to the virtual file system in response to the user command to a tool and locating the encrypted file by redirection by the tool.

8. The computer program product as recited in claim 1, wherein intercepting the read operation activates a secure channel to the user system.

9. The computer program product as recited in claim 1, wherein the program code further comprises the programming instructions for:

caching the decrypted file in the virtual file system for a predefined temporary period.

10. The computer program product as recited in claim 9, wherein the program code further comprises the programming instructions for:

checking for cached decrypted files before sending the encrypted file to the client at the user system external to the secure environment.

11. A system, comprising:
a memory for storing a computer program for secure access management for tools within a secure environment; and
a processor connected to the memory, wherein the processor is configured to execute program instructions of the computer program comprising:
   obtaining at a virtual file system an encrypted file stored in the secure environment, wherein the file holds sensitive data and is encrypted using a public key of a user;
   intercepting a read operation at the virtual file system of the encrypted file and sending the encrypted file to a client at a user system external to the secure environment over a secure connection for decryption by a remote cryptography device of the user system using the user's private key; and
   receiving the decrypted file at the virtual file system enabling the user to run a user command.

12. The system as recited in claim 11, wherein the virtual file system is generated for each user session or is a central virtual file system that is user aware and is provided by a software interface for a computer operating system for creating virtual file systems in user space.

13. The system as recited in claim 11, wherein the program instructions of the computer program further comprise:
   receiving the user command from the user system external to the secure environment to carry out the read operation of the encrypted file, wherein the user command is directed to a server from a tool to which the command is directed.

14. The system as recited in claim 11, wherein the program instructions of the computer program further comprise:
   verifying access permissions of the user according to stored access permissions in the secure environment, wherein the access permissions for the encrypted file are stored and accessed in association with the encrypted file.

15. The system as recited in claim 11, wherein the program instructions of the computer program further comprise:
   storing encrypted files in a central repository of encrypted files for multiple tools within the secure environment, wherein the encrypted files are encrypted with public keys of users of the tools.

16. The system as recited in claim 15, wherein the program instructions of the computer program further comprise:
   downloading encrypted files from the central repository to the virtual file system for the user prior to a user session.

17. The system as recited in claim 15, wherein the program instructions of the computer program further comprise:
   syncing an encrypted file from the central repository to the virtual file system in response to the user command to a tool and locating the encrypted file by redirection by the tool.

18. The system as recited in claim 11, wherein intercepting the read operation activates a secure channel to the user system.

19. The system as recited in claim 11, wherein the program instructions of the computer program further comprise:
   caching the decrypted file in the virtual file system for a predefined temporary period.

20. The system as recited in claim 19, wherein the program instructions of the computer program further comprise:
   checking for cached decrypted files before sending the encrypted file to the client at the user system external to the secure environment.

* * * * *